US012711902B2

(12) United States Patent
Huh et al.

(10) Patent No.: US 12,711,902 B2
(45) Date of Patent: Aug. 18, 2026

(54) DISPLAY DEVICE

(71) Applicant: Samsung Display Co., LTD., Yongin-si (KR)

(72) Inventors: Joon Huh, Yongin-si (KR); Sanghyun Kang, Yongin-si (KR); Sang-Myoung Lee, Yongin-si (KR); Jaehoon Lee, Yongin-si (KR); Joosun Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/957,823

(22) Filed: Nov. 24, 2024

(65) Prior Publication Data

US 2025/0087141 A1 Mar. 13, 2025

(30) Foreign Application Priority Data

Feb. 7, 2024 (KR) ........................ 10-2024-0018958

(51) Int. Cl.
*G09G 3/32* (2016.01)

(52) U.S. Cl.
CPC ....... *G09G 3/32* (2013.01); *G09G 2300/0452* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/045* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 8,068,086 B2 | 11/2011 | Moon | | |
| 10,957,255 B2 | 3/2021 | Ka et al. | | |
| 2007/0188430 A1* | 8/2007 | Moon | G09G 3/3696 | 345/89 |
| 2011/0181567 A1* | 7/2011 | Tanba | H04N 5/58 | 345/207 |
| 2014/0028859 A1* | 1/2014 | Kim | G09G 3/30 | 348/189 |

(Continued)

FOREIGN PATENT DOCUMENTS

| | | | |
|---|---|---|---|
| KR | 1020070081806 A | 8/2007 | |
| KR | 102523646 B1 | 4/2023 | |

*Primary Examiner* — Kenneth Bukowski
(74) *Attorney, Agent, or Firm* — CANTOR COLBURN LLP

(57) ABSTRACT

A display device includes: a memory, a driving controller, a light emitting element, a first transistor including a first electrode, a second electrode, and a gate electrode for receiving a data signal, a second transistor connected between a first driving voltage line and the first electrode of the first transistor and receiving a first emission signal, and a third transistor connected between the second electrode of the first transistor and the light emitting element and receiving a second emission signal. The first emission signal includes a compensation period and an emission period, and the memory stores instructions that, when executed by the driving controller, cause the driving controller to determine a compensation time of the compensation period depending on target luminance.

20 Claims, 13 Drawing Sheets

(56) References Cited

U.S. PATENT DOCUMENTS

| | | | | |
|---|---|---|---|---|
| 2016/0189623 | A1* | 6/2016 | Miwa | G09G 3/3233 345/212 |
| 2017/0124941 | A1* | 5/2017 | Na | G09G 3/2092 |
| 2018/0122327 | A1* | 5/2018 | Kim | G09G 3/3688 |
| 2019/0130835 | A1* | 5/2019 | Ka | G09G 3/3225 |
| 2020/0302868 | A1* | 9/2020 | Kim | G09G 3/3233 |
| 2022/0140042 | A1* | 5/2022 | Kim | H10K 59/131 257/43 |
| 2022/0366849 | A1* | 11/2022 | Lee | H10K 59/131 |
| 2023/0260448 | A1* | 8/2023 | Lee | G09G 3/32 345/55 |

* cited by examiner

FIG. 15A

| Compensation Time | VINT_G | VINT_R VINT_B | ELVSS | DBV5 11G (1NIT) | | DBV1 39G (0.06NIT) | |
|---|---|---|---|---|---|---|---|
| | | | | ΔL | du'v' | ΔL | du'v' |
| 46H | −3.50 | −2.0 | 0.0 | −1.5% | 0.0144 | 11% | 0.0172 |

FIG. 15B

| Compensation Time | VINT_G | VINT_R VINT_B | ELVSS | DBV5 11G (1NIT) | | DBV1 39G (0.06NIT) | |
|---|---|---|---|---|---|---|---|
| | | | | ΔL | du'v' | ΔL | du'v' |
| 50H | −3.50 | −2.0 | 0.0 | 0.5% | 0.0144 | | |
| 26H | −3.50 | −2.0 | 0.0 | | | 0.9% | 0.0172 |

FIG. 15C

| Compensation Time | VINT_G | VINT_R VINT_B | ELVSS | DBV5 11G (1NIT) | | DBV1 39G (0.06NIT) | |
|---|---|---|---|---|---|---|---|
| | | | | ΔL | du'v' | ΔL | du'v' |
| 50H | −3.50 | −3.5 | 0.0 | 0.5% | 0.0078 | | |
| 26H | −5 | −1 | 0.0 | | | 0.9% | 0.0097 |

DISPLAY DEVICE

This application claims priority to Korean Patent Application No. 10-2024-0018958, filed on Feb. 7, 2024, and all the benefits accruing therefrom under 35 U.S.C. § 119, the content of which in its entirety is herein incorporated by reference.

BACKGROUND

Embodiments of the present disclosure described herein relate to an electronic device.

An electronic device includes pixels connected to data lines and scan lines. Each of the pixels includes a light emitting element and a pixel circuit for controlling the light emitting element. The pixel circuit may provide a current 5 corresponding to a data signal to the light emitting element. At this time, light having predetermined luminance may be generated in response to a current flowing through the light emitting element.

SUMMARY

Embodiments of the present disclosure provide an electronic device having the improved display quality.

According to an embodiment, an electronic device includes: a memory, a driving controller, a light emitting element, a first transistor including a first electrode, a second electrode, and a gate electrode for receiving a data signal, a second transistor connected between a first driving voltage line and the first electrode of the first transistor and receiving a first emission signal, and a third transistor connected between the second electrode of the first transistor and the light emitting element and receiving a second emission signal. The first emission signal includes a compensation period and an emission period, and the memory stores instructions that, when executed by the driving controller, cause the driving controller to determine a compensation time of the compensation period depending on target luminance.

In an embodiment, the first emission signal may be at an active level for turning on the second transistor in each of the compensation period and the emission period.

In an embodiment, when the target luminance has a first value, a compensation time of the compensation period may be a first time. When the target luminance has a second value, the compensation time of the compensation period may be a second time. The memory may store instructions that, when executed by the driving controller, cause the driving controller to set the first time longer than the second time when the first value is greater than the second value.

In an embodiment, the electronic device may further include a fourth transistor connected between the light emitting element and an initialization voltage line that receives an initialization voltage.

In an embodiment, the memory may store instructions that, when executed by the driving controller, cause the driving controller to determine a voltage level of the initialization voltage depending on characteristics of the light emitting element.

In an embodiment, each of the first transistor, the second transistor, and the third transistor may be an N-type transistor.

According to an embodiment, an electronic device includes: a memory, a display panel including a plurality of pixels, each of which is connected to a plurality of scan lines, a first emission line, a second emission line, and a data line, a scan driving circuit that outputs a plurality of scan signals to the plurality of scan lines, an emission driving circuit that outputs a first emission signal and a second emission signal to the first emission line and the second emission line, respectively, and a driving controller that controls the emission driving circuit depending on target luminance. Each of the plurality of pixels includes a light emitting element, a first transistor including a first electrode, a second electrode, and a gate electrode that receives a data signal from the data line, a second transistor connected between a first driving voltage line and the first electrode of the first transistor and receiving the first emission signal, and a third transistor connected between the second electrode of the first transistor and the light emitting element and receiving the second emission signal. The first emission signal includes a compensation period and an emission period, and the memory stores instructions that, when executed by the driving controller, cause the driving controller to determine a compensation time of the compensation period depending on the target luminance.

In an embodiment, the first emission signal may be at an active level for turning on the second transistor in each of the compensation period and the emission period.

In an embodiment, when the target luminance has a first value, a compensation time of the compensation period may be a first time. When the target luminance has a second value, the compensation time of the compensation period may be a second time. The memory may store instructions that, when executed by the driving controller, cause the driving controller to set the first time longer than the second time when the first value is greater than the second value.

In an embodiment, the plurality of pixels includes a first color pixel, a second color pixel, and a third color pixel.

In an embodiment, the electronic device may further include a voltage generator that generates a first initialization voltage provided to the first color pixel, a second initialization voltage provided to the second color pixel, and a third initialization voltage provided to the third color pixel. The memory may store instructions that, when executed by the driving controller, cause the driving controller to determine a voltage level of each of the first initialization voltage, the second initialization voltage, and the third initialization voltage depending on luminance deviation between the first color pixel, the second color pixel, and the third color pixel.

In an embodiment, the first color pixel may further include a fourth transistor connected between the light emitting element and a first initialization voltage line that receives the first initialization voltage.

In an embodiment, the first color pixel may further include a fifth transistor connected between the data line and the gate electrode of the first transistor, and including a gate electrode connected to a first scan line of the plurality of scan lines, and a sixth transistor connected between a reference voltage line and the gate electrode of the first transistor and including a gate electrode connected to a second scan line of the plurality of scan lines.

In an embodiment, the first color pixel may further include a capacitor including a first electrode connected to the first gate electrode of the first transistor, and a second electrode, and a seventh transistor connected between the second electrode of the capacitor and a second initialization voltage line.

In an embodiment, each of the first transistor, the second transistor, and the third transistor may be an N-type transistor.

According to an embodiment, an electronic device includes: a memory, a driving controller, a display panel including a first color pixel, a second color pixel, and a third color pixel, and a voltage generator that generates a first initialization voltage provided to the first color pixel, a second initialization voltage provided to the second color pixel, and a third initialization voltage provided to the third color pixel. The memory stores instructions that, when executed by the driving controller, cause the driving controller to determine a voltage level of each of the first initialization voltage, the second initialization voltage, and the third initialization voltage depending on luminance deviation between the first color pixel, the second color pixel, and the third color pixel.

In an embodiment, the first color pixel may include a light emitting element that emits first color light, a first transistor including a first electrode, a second electrode, and a gate electrode that receives a data signal, a second transistor connected between a first driving voltage line and the first electrode of the first transistor and receiving a first emission signal, a third transistor connected between the second electrode of the first transistor and the light emitting element and receiving a second emission signal, and a fourth transistor connected between the light emitting element and an initialization voltage line that receives the first initialization voltage.

In an embodiment, the first emission signal may include a compensation period and an emission period, and the memory may store instructions that, when executed by the driving controller, cause the driving controller to determine a compensation time of the compensation period depending on the target luminance.

In an embodiment, the first emission signal may be at an active level for turning on the second transistor in each of the compensation period and the emission period.

In an embodiment, when the target luminance has a first value, a compensation time of the compensation period may be a first time. When the target luminance has a second value, the compensation time of the compensation period may be a second time. When the first value is greater than the second value, the first time may be longer than the second time.

BRIEF DESCRIPTION OF THE FIGURES

The above and other aspects and features of the present disclosure will become apparent by describing in detail embodiments thereof with reference to the accompanying drawings.

FIGS. 15A, 15B, and 15C show luminance deviation and chromaticity deviation according to a compensation time of the compensation period CP, a first initialization voltage, a second initialization voltage, and a third initialization voltage.

DETAILED DESCRIPTION

Figure 1:
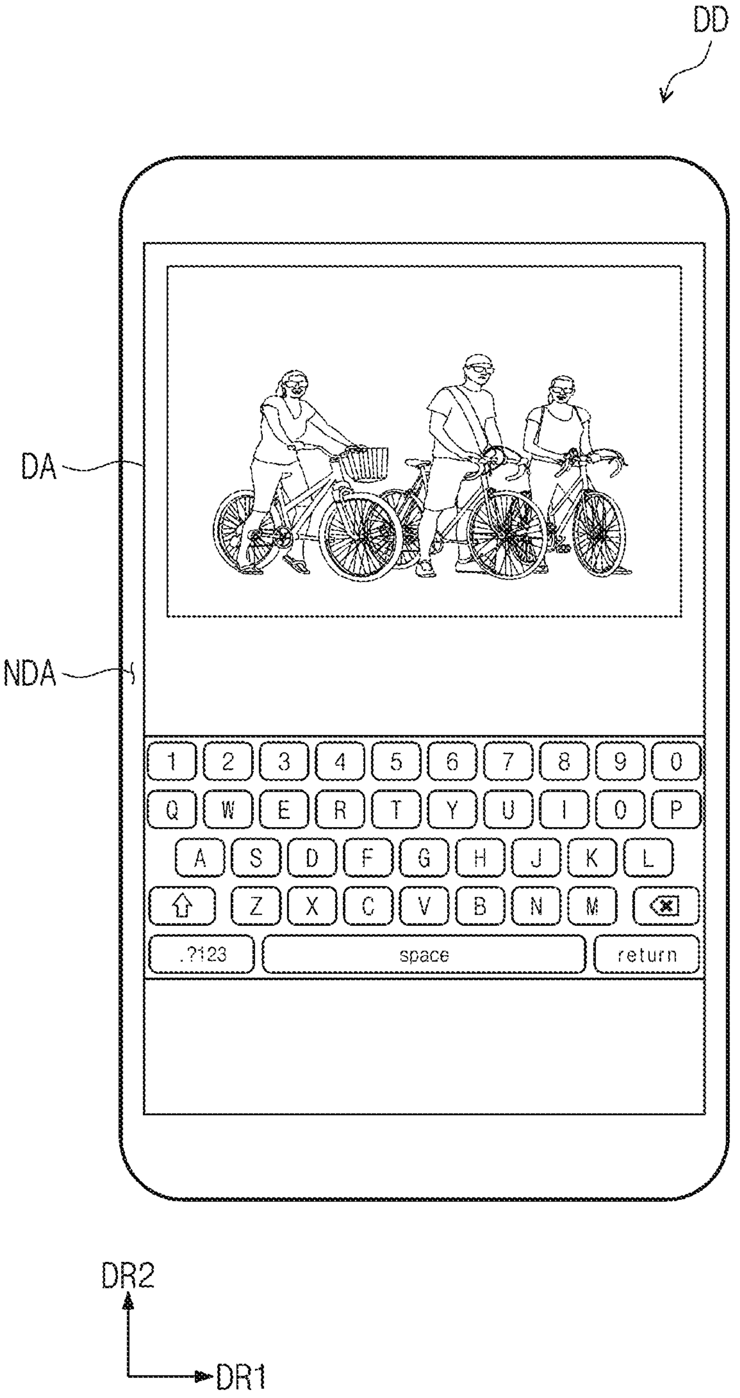
FIG. 1 is a plan view of an electronic device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a plan view of an electronic device DD, according to an embodiment of the present disclosure.

Referring to FIG. 1, a portable terminal is illustrated as an example of an electronic device DD according to an embodiment of the present disclosure. The portable terminal may include a tablet PC, a smartphone, a personal digital assistant ("PDA"), a portable multimedia player ("PMP"), a game console, a wristwatch-type electronic device, and the like. However, the present disclosure is not limited thereto. The present disclosure may be used for small and medium electronic devices such as a personal computer, a notebook computer, a kiosk, a car navigation unit, and a camera, in addition to large-sized electronic equipment such as a television or an outside billboard. The above examples are provided only as an embodiment, and it is obvious that the electronic device DD may be applied to any other electronic device(s) without departing from the concept of the present disclosure.

As shown in FIG. 1, a display surface, on which an image is displayed, is parallel to a plane defined by a first direction DR1 and a second direction DR2. The electronic device DD includes a plurality of areas separated on the display surface. The display surface includes a display area DA, in which the image is displayed, and a non-display area NDA adjacent to the display area DA. The non-display area NDA may be referred to as a bezel area. For example, the display area DA may have a rectangular shape. The non-display area NDA surrounds the display area DA. Also, although not illustrated, for example, the electronic device DD may include a shape thus partially curved.

Figure 2:
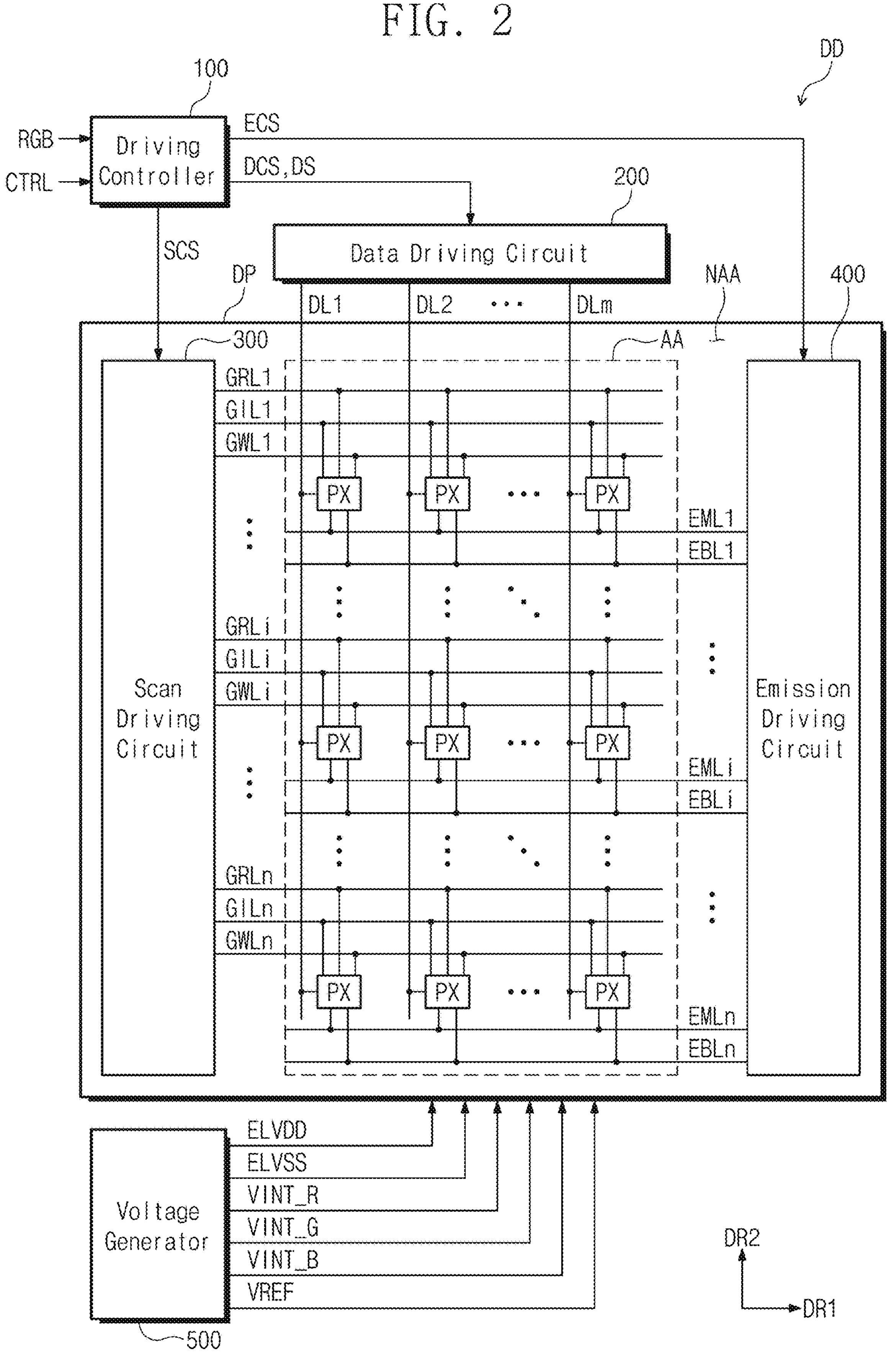
FIG. 2 is a block diagram of an electronic device, according to an embodiment of the present disclosure.

FIG. 2 is a block diagram of the electronic device DD, according to an embodiment of the present disclosure.

Referring to FIG. 2, the electronic device DD includes a display panel DP, a driving controller 100, a data driving circuit 200, a scan driving circuit 300, an emission driving circuit 400, and a voltage generator 500.

The driving controller 100 receives an image signal RGB and a control signal CTRL. The driving controller 100 converts the image signal RGB into an image data signal DS and outputs the image data signal DS. The driving controller 100 outputs a scan control signal SCS, a data control signal DCS, and an emission control signal ECS in response to the control signal CTRL. In an embodiment, the control signal CTRL may include target luminance information. The driving controller 100 may output the emission control signal ECS based on the target luminance information included in the control signal CTRL.

Even though not shown in FIG. 2, the electronic device DD may further include a memory inside or outside the driving controller 100 so that instructions stored in the memory, when executed by the driving controller 100, may cause the driving controller 100 to perform several functions (e.g., determining the emission control signal ECS based on the target luminance information, and functions to be described later)

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later.

The scan driving circuit 300 receives the scan control signal SCS from the driving controller 100. The scan driving circuit 300 may output scan signals to scan lines GRL1 to GRLn, GIL1 to GILn, and GWL1 to GWLn in response to the scan control signal SCS.

The scan driving circuit 300 receives the emission control signal ECS from the driving controller 100. The scan driving circuit 300 may output emission signals to emission lines EML1 to EMLn and EBL1 to EBLn in response to the emission control signal ECS.

The voltage generator 500 generates voltages to operate the display panel DP. In an embodiment, the voltage generator 500 may generate a first driving voltage ELVDD, a second driving voltage ELVSS, a first initialization voltage VINT_R, a second initialization voltage VINT_G, a third initialization voltage VINT_B, and a reference voltage VREF, which are for an operation of the display panel DP.

The display panel DP includes the scan lines GRL1 to GRLn, GIL1 to GILn, and GWL1 to GWLn, the emission lines EML1 to EMLn and EBL1 to EBLn, the data lines DL1 to DLm, and pixels PX.

The display panel DP includes an active area AA and an inactive area NAA. The active area AA may correspond to the display area DA of the electronic device DD shown in FIG. 1, and the inactive area NAA may correspond to the non-display area NDA.

In an embodiment, the pixels PX may be placed in the active area AA of the display panel DP. The scan driving circuit 300 and the emission driving circuit may be placed in the inactive area NAA of the display panel DP. In an embodiment, the scan driving circuit 300 is arranged adjacent to the first side of the active area AA. The scan lines GRL1 to GRLn, GIL1 to GILn, and GWL1 to GWLn extend from the scan driving circuit 300 in the first direction DR1. The emission driving circuit 400 is arranged adjacent to the second side of the active area AA. The emission lines EML1 to EMLn and EBL1 to EBLn extend from the emission driving circuit 400 in a direction opposite to the first direction DR1.

The scan lines GRL1 to GRLn, GIL1 to GILn, and GWL1 to GWLn and the emission lines EML1 to EMLn and EBL1 to EBLn are arranged spaced from each other in the second direction DR2. The data lines DL1 to DLm extend from the data driving circuit 200 in a direction opposite to the second direction DR2, and are arranged spaced from one another in the first direction DR1.

In the example shown in FIG. 2, the scan driving circuit 300 and the emission driving circuit 400 are arranged to face each other with the pixels PX interposed therebetween, but the present disclosure is not limited thereto. For example, the scan driving circuit 300 and the emission driving circuit 400 may be placed adjacent to each other in the inactive area NAA of the display panel DP. In an embodiment, the scan driving circuit 300 and the emission driving circuit 400 may be implemented with one circuit.

Figure 4:
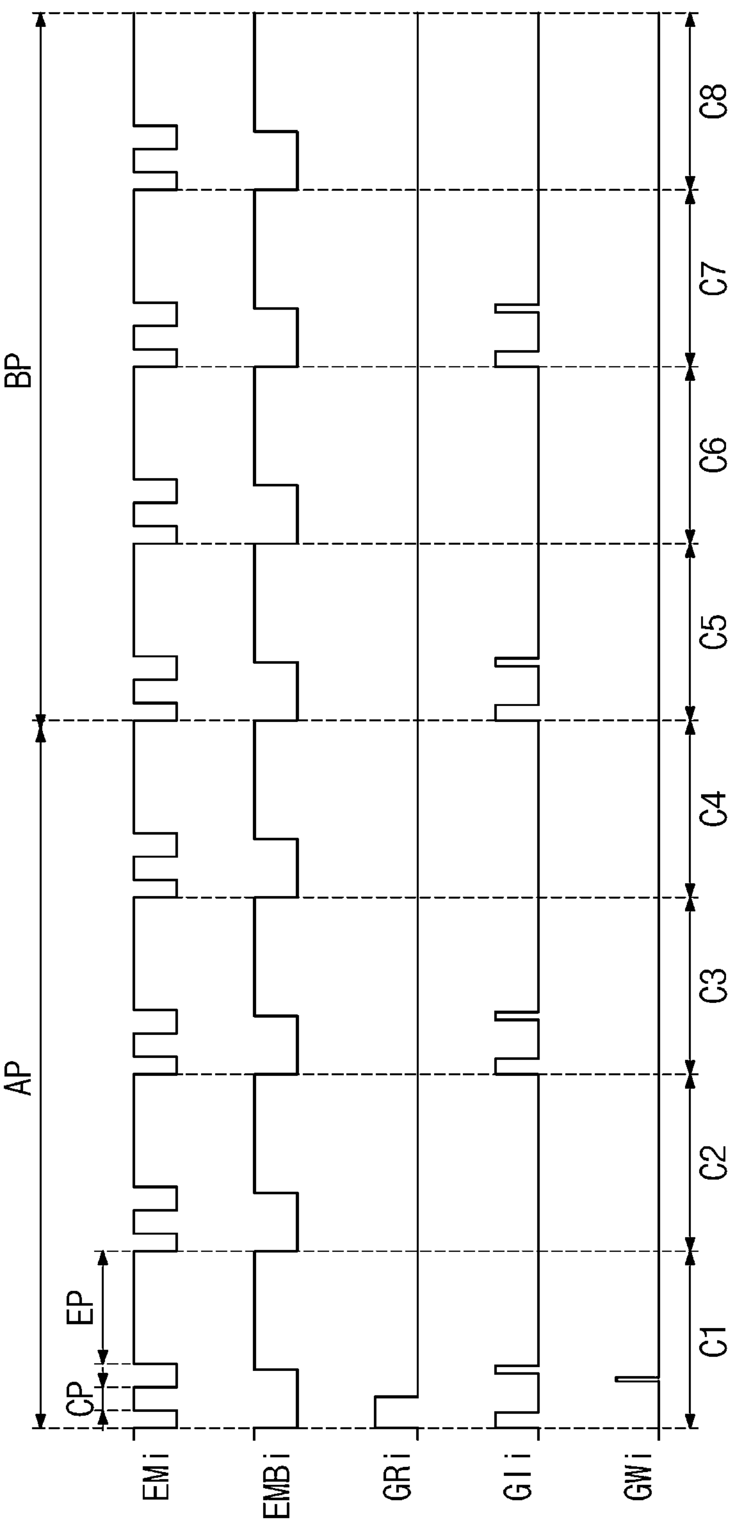
FIG. 4 is a timing diagram showing an operation of a pixel.

The plurality of pixels PX are electrically connected to the scan lines GRL1 to GRLn, GIL1 to GILn, and GWL1 to GWLn, the emission lines EML1 to EMLn and EBL1 to EBLn, and the data lines DL1 to DLm. Each of the plurality of pixels PX may be electrically connected to three scan lines and two emission lines. For example, as shown in FIG. 4, a first row of pixels may be connected to the scan lines GRL1, GIL1, and GWL1, and the emission lines EML1 and EBL1. Furthermore, an i-th row of pixels may be connected to the scan lines GILi, GCLi, and GWLi, and the emission lines EMLi and EBLi. Also, an n-th row of pixels may be connected to the scan lines GILn, GCLn, and GWLn and the emission lines EMLn and EBLn.

Each of the plurality of pixels PX includes a light emitting element ED (see FIG. 3) and a pixel circuit PXC (see FIG. 3) for controlling the emission of the light emitting element ED. The pixel circuit PXC may include one or more transistors and one or more capacitors. The scan driving circuit 300 and the emission driving circuit 400 may include transistors formed through the same process as the pixel circuit PXC.

Figure 3:
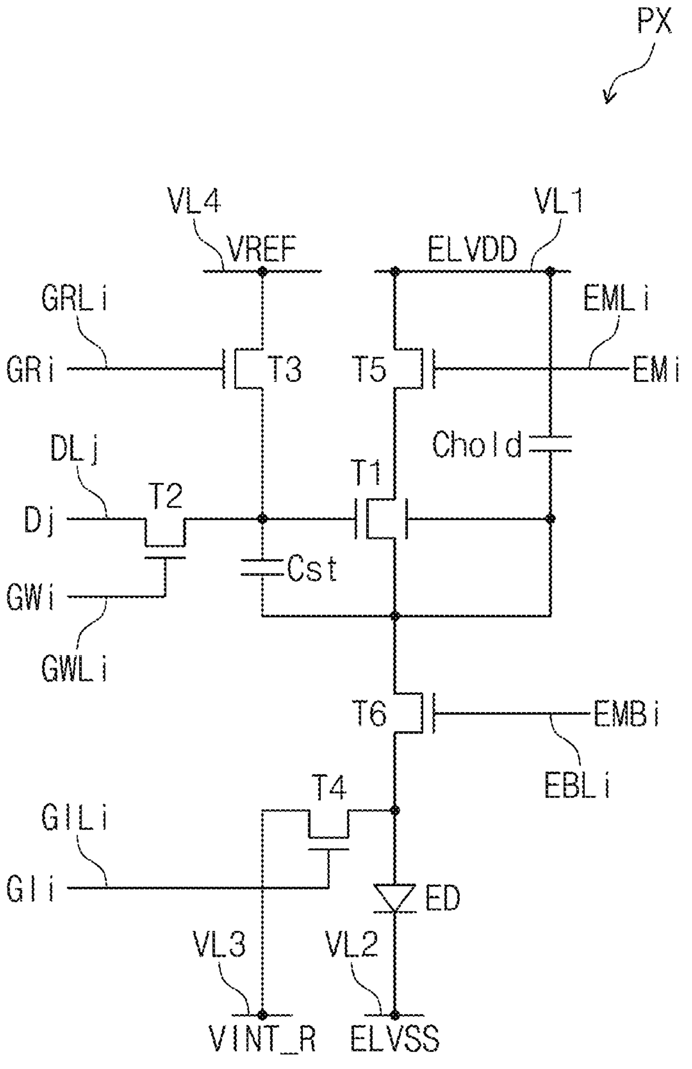
FIG. 3 is a circuit diagram of a pixel, according to an embodiment of the present disclosure.

FIG. 3 is a circuit diagram of a pixel PX, according to an embodiment of the present disclosure. FIG. 4 is a timing diagram showing an operation of a pixel PX.

FIG. 3 illustrates a circuit diagram of a pixel PX connected to the j-th data line DLj among the data lines DL1 to DLm, the i-th scan lines GILi, GCLi, and GWLi among the scan lines GRL1 to GILn, GIL1 to GCLn, and GWL1 to GWLn, and the i-th emission lines EMLi and EBLi among the emission lines EML1 to EMLn and EBL1 to EBLn, which are illustrated in FIG. 2.

Each of the plurality of pixels PX shown in FIG. 2 may have the same circuit configuration as the pixel PX shown in FIG. 3.

Referring to FIGS. 3 and 4, the pixel PX according to an embodiment includes first to sixth transistors T1, T2, T3, T4, T5, and T6, a first capacitor Cst, a second capacitor Chold, and a light emitting element ED. In an embodiment, the light emitting element ED may be a light emitting diode.

In an embodiment, each of the first to sixth transistors T1 to T6 may be an N-type transistor by using an oxide semiconductor as a semiconductor layer. However, the present disclosure is not limited thereto. For example, at least one of the first to sixth transistors T1 to T6 may be a P-type transistor having a low-temperature polycrystalline silicon ("LTPS") semiconductor layer. The pixel PX illustrated in FIG. is only an example, and the circuit configuration of the pixel PX may be modified and implemented.

The scan lines GRLi, GILi, and GWLi may deliver scan signals GRi, Gli, and GWi, respectively. The emission lines EMLi and EBLi may deliver emission signals EMi and EBi, respectively. The data line DLj delivers a data signal Dj. The data signal Dj may have a voltage level corresponding to the input image signal RGB that is input to the electronic device DD (see FIG. 1). First to fourth driving voltage lines VL1, VL2, VL3, and VL4 may deliver the first driving voltage ELVDD, the second driving voltage ELVSS, the first initialization voltage VINT_R, and the reference voltage VREF, respectively.

In an embodiment, the light emitting element ED included in the pixel PX shown in FIG. 3 emits first color light, and thus the pixel PX receives the first initialization voltage VINT_R. When the light emitting element ED included in the pixel PX emits second color light, the pixel PX may receive the second initialization voltage VINT_G (see FIG. 2). When the light emitting element ED included in the pixel PX emits third color light, the pixel PX may receive a third initialization voltage VINT_B (see FIG. 2).

The first transistor T1 includes a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Dj through the data line DLj depending on a switching operation of the second transistor T2 and may supply a driving current to the light emitting element ED.

The first capacitor Cst includes a first electrode connected to the second electrode of the first transistor T1 and a second electrode connected to the gate electrode of the first transistor T1.

The second capacitor Chold includes a first electrode connected to the first voltage line VL1 and a second electrode connected to a lower gate electrode of the first transistor T1. The second electrode of the second capacitor Chold may also be connected to the second electrode of the first transistor T1.

The second transistor T2 includes a first electrode connected to the data line DLj, a second electrode connected to the gate electrode of the first transistor T1, and a gate electrode connected to the scan line GWLi. The second transistor T2 may be turned on in response to the scan signal GWi transferred through the scan line GWLi and may transfer the data signal Dj transferred through the data line DLj to the gate electrode of the first transistor T1.

The third transistor T3 is connected between the fourth voltage line VL4 and the gate electrode of the first transistor T1, and includes a gate electrode connected to the scan line GRLi. The third transistor T3 is turned on in response to a scan signal GRi received through the scan line GRLi and delivers the reference voltage VREF from the fourth voltage line VL4 to the gate electrode of the first transistor T1.

The fourth transistor T4 is connected between the anode of the light emitting element ED and a third driving voltage line VL3 through which the first initialization voltage VINT_R is transmitted, and includes a gate electrode connected to the scan line GILi. In an embodiment, the third driving voltage line VL3 may be called an initialization voltage line. The fourth transistor T4 is turned on in response to a scan signal Gli received through the scan line GILi and delivers the first initialization voltage VINT_R to the anode of the light emitting element ED. Accordingly, an initialization operation of initializing the anode of the light emitting element ED may be performed.

The fifth transistor T5 includes a first electrode connected to the first driving voltage line VL1, a second electrode connected to the first electrode of the first transistor T1, and a gate electrode connected to the emission line EMLi.

The fifth transistor T5 is turned on in response to the emission signal EMi (hereinafter "first emission signal") received through the emission line EMLi and may deliver the first driving voltage ELVDD to the first electrode of the first transistor T1.

The sixth transistor T6 includes a first electrode connected with the second electrode of the first transistor T1, a second electrode connected with the anode of the light emitting element ED, and a gate electrode connected with the emission line EBLi.

The sixth transistor T6 is turned on in response to the emission signal EMBi (hereinafter "second emission signal") received through the emission line EBLi, such that the second electrode of the first transistor T1 may be connected to the anode of the light emitting element ED.

The operation period of the pixel PX includes an address period AP, in which the data signal Dj is received, and a blank period BP in which the data signal Dj is not received.

The address period AP may include four cycles C1, C2, C3, and C4, and the blank period BP may include four cycles C5, C6, C7, and C8.

When the scan signal GWi is activated at a high level in the first cycle C1 of the address period AP, the data signal Dj may be provided to the gate electrode of the first transistor T1.

Each of the cycles C1 to C8 includes a compensation period CP and an emission period EP.

When the emission signal EMi is at an active level (e.g., a high level) during the compensation period CP, the fifth transistor T5 may be turned on such that the first driving voltage ELVDD may be delivered to the first electrode of the first transistor T1. In this case, when the scan signal GRi is at a high level, the third transistor T3 is also turned on. The first transistor T1 may be turned on by the reference voltage VREF delivered through the third transistor T3. As a result, a difference (i.e., a voltage corresponding to "ELVDD-Vth") between the first driving voltage ELVDD and the threshold voltage (hereinafter referred to as "Vth") of the first transistor T1 may be delivered to the first electrode of the first capacitor Cst (i.e., the second electrode of the first transistor T1). A voltage boosted by "ELVDD-Vth" from the reference voltage VREF may be applied to the second electrode of the first capacitor Cst (i.e., the voltage of the gate of the first transistor T1). In other words, the compensation period CP may be a period for compensating for the threshold voltage Vth of the first transistor T1.

When the scan signal GIi is activated at a high level, the fourth transistor T4 may be turned on, and thus the anode of the light emitting element ED may be initialized to the first initialization voltage VINT_R.

When the scan signal GWi is activated at a high level, the second transistor T2 is turned on and the data signal Dj is delivered to the gate electrode of the first transistor T1.

When the fifth transistor T5 and the sixth transistor T6 are turned on at the same time during the emission period EP in which the emission signals EMi and EMBi are at high levels, a current path may be formed between the first driving voltage line VL1 and the light emitting element ED. In this case, the driving current corresponding to the data signal Dj provided to the gate electrode of the first transistor T1 is provided to the light emitting element ED through the first transistor T1, and thus the light emitting element ED may emit light.

Figure 5:
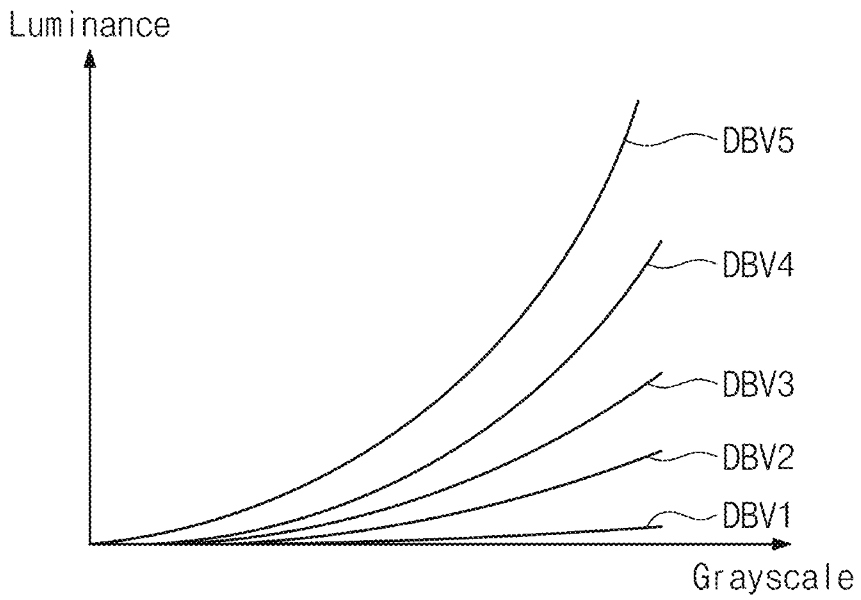
FIG. 5 is a diagram showing a relationship between a grayscale level of an image signal and luminance according to target luminance.

FIG. 5 is a diagram showing a relationship between a grayscale level of the image signal RGB and luminance according to target luminance.

Referring to FIG. 5, even though the grayscale level of the image signal RGB is the same, the luminance of the image displayed on the electronic device DD varies depending on the first to fifth target luminances DBV1, DBV2, DBV3, DBV4, and DBV5.

When the grayscale level of the image signal RGB is the same, the luminance of the image displayed on the electronic device DD is high as the target luminance is high. In an embodiment, the target luminance has the relationship of "DBV1<DBV2<DBV3<DBV4<DBV5".

One of methods for adjusting the luminance of the image displayed on the electronic device DD according to the first to fifth target luminances DBV1, DBV2, DBV3, DBB4, and DBV5 is to adjust pulse widths of the emission signals EMi and EMBi.

The relationship between the grayscale level of the image signal RGB and luminance with respect to each of the first to fifth target luminances DBV1, DBV2, DBV3, DBB4, and DBV5 shown in FIG. 5 is only an example, and the present disclosure is not limited thereto.

Figure 6:
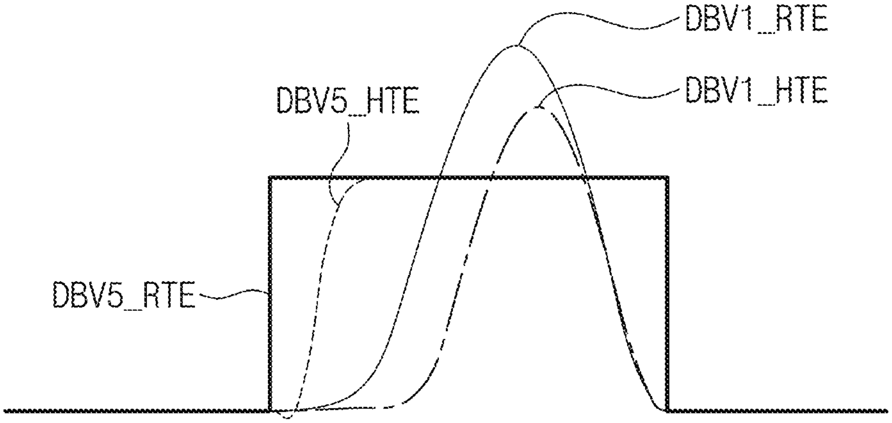
FIG. 6 is a diagram showing an emission signal according to target luminance and ambient temperature.

FIG. 6 is a diagram showing the emission signal EMi according to target luminance and ambient temperature.

Referring to FIGS. 5 and 6, the fifth target luminance DBV5 has a higher value than the first target luminance DBV1.

A first line DBV5_RTE is the emission signal EMi corresponding to the fifth target luminance DBV5 at room temperature (e.g., 25 degrees in Celsius (° C.)).

A second line DBV5_HTE is the emission signal EMi corresponding to the fifth target luminance DBV5 at high temperature (e.g., 40° C.).

A third line DBV1_RTE is the emission signal EMi corresponding to the first target luminance DBV1 at room temperature (e.g., 25° C.).

A fourth line DBV1_HTE is the emission signal EMi corresponding to the first target luminance DBV1 at high temperature (e.g., 40° C.).

As the target luminance is lower, the high level period of the emission signal EMi, that is, the emission period EP (see FIG. 4) is shorter.

Moreover, even though the target luminance is the same, the waveform of the emission signal EMi may change depending on the ambient temperature.

In particular, when the target luminance is low (e.g., the first target luminance DBV1) and the ambient temperature is high, the pulse width of the emission signal EMi decreases, and thus the pixel PX (see FIG. 3) may not sufficiently emit light with the desired luminance.

Figure 7:
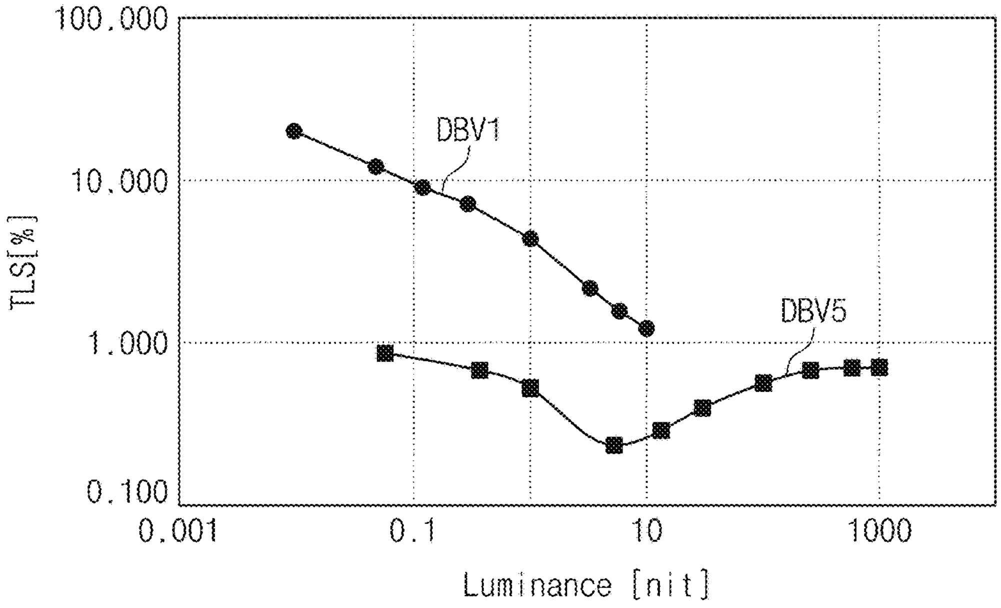
FIG. 7 is a graph showing a change in a first display quality according to target luminance.

FIG. 7 is a graph showing a change in a first display quality TLS according to target luminance.

FIG. 7 shows a change in the first display quality TLS according to the first target luminance DBV1 and the fifth target luminance DBV5.

In an embodiment, the first display quality TLS is the temperature luminance sensitivity of the electronic device DD (see FIG. 1). For example, the first display quality TLS may be a value expressing the amount of luminance change according to the amount of change in temperature as a ratio.

Referring to FIG. 7, at the fifth target luminance DBV5, a change in the first display quality TLS according to luminance is less than 1% at most. At the first target luminance DBV1, the maximum change in the first display quality TLS according to luminance is about 10%.

When the target luminance is the first target luminance DBV1, the first display quality TLS (i.e., luminance) of the electronic device DD may change rapidly depending on the ambient temperature. These luminance changes may deteriorate the display quality of the electronic device DD.

Figure 8:
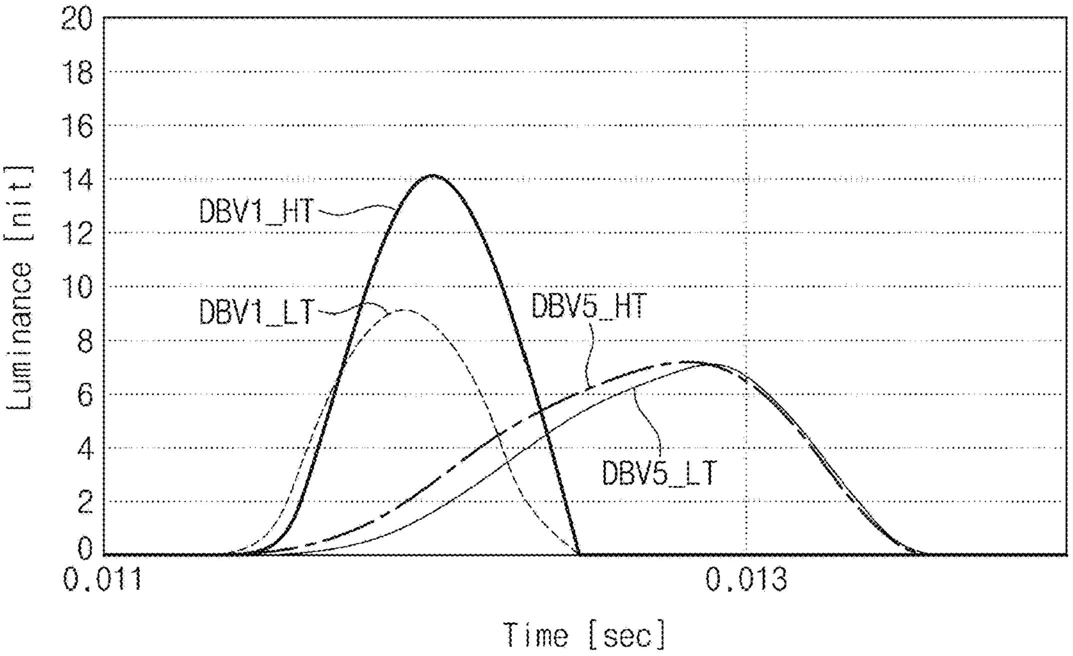
FIG. 8 is a graph showing a change in pixel luminance according to target luminance and ambient temperature.

FIG. 8 is a graph showing a change in pixel luminance according to target luminance and ambient temperature.

In FIG. 8, when the target luminance is the first target luminance DBV1, and the ambient temperature is low (e.g., 10° C.), a first line DBV1_LT shows a luminance change of the pixel PX (see FIG. 3) over time.

When the target luminance is the first target luminance DBV1, and the ambient temperature is high (e.g., 40° C.), a second line DBV1_HT shows the luminance change of the pixel PX over time.

When the target luminance is the fifth target luminance DBV5, and the ambient temperature is low (e.g., 10° C.), a third line DBV5_LT shows the luminance change of the pixel PX over time.

When the target luminance is the fifth target luminance DBV5, and the ambient temperature is high (e.g., 40° C.), a fourth line DBV5_HT shows the luminance change of the pixel PX over time.

Referring to FIG. 8, when the target luminance is the fifth target luminance DBV5, a change in luminance of the pixel PX according to changes in ambient temperature is not significant. However, when the ambient temperature is low and the target luminance is the first target luminance DBV1, a change in luminance of the pixel PX according to temperature is greater.

Figure 9A:
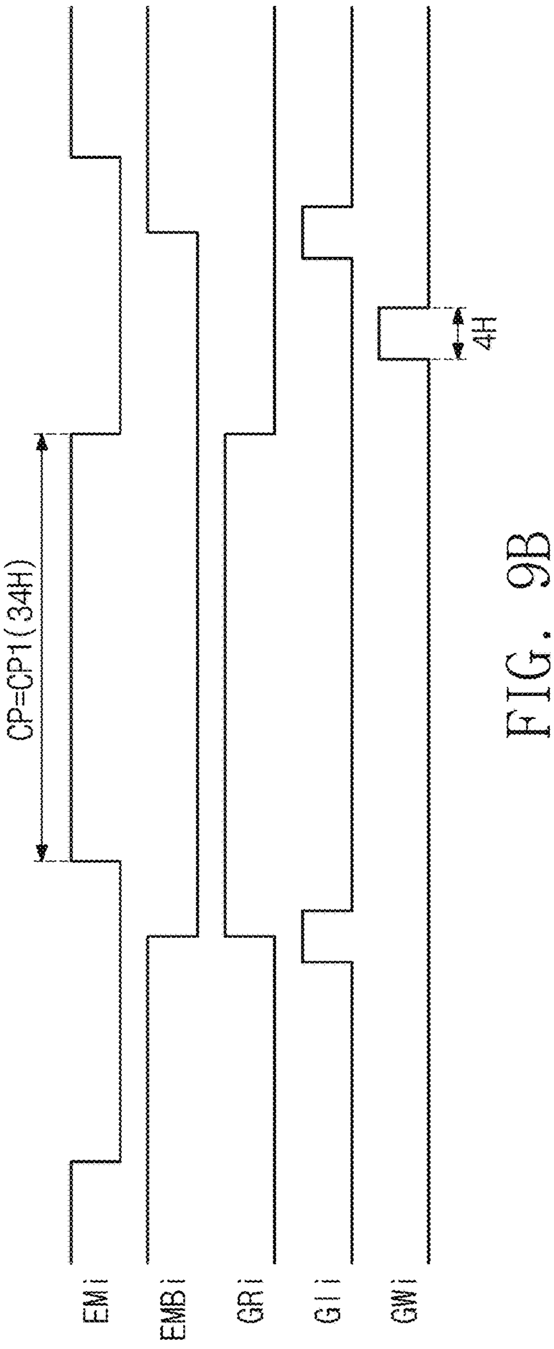
FIGS. 9A and 9B are timing diagrams showing an operation of a pixel.
Figure 9B:
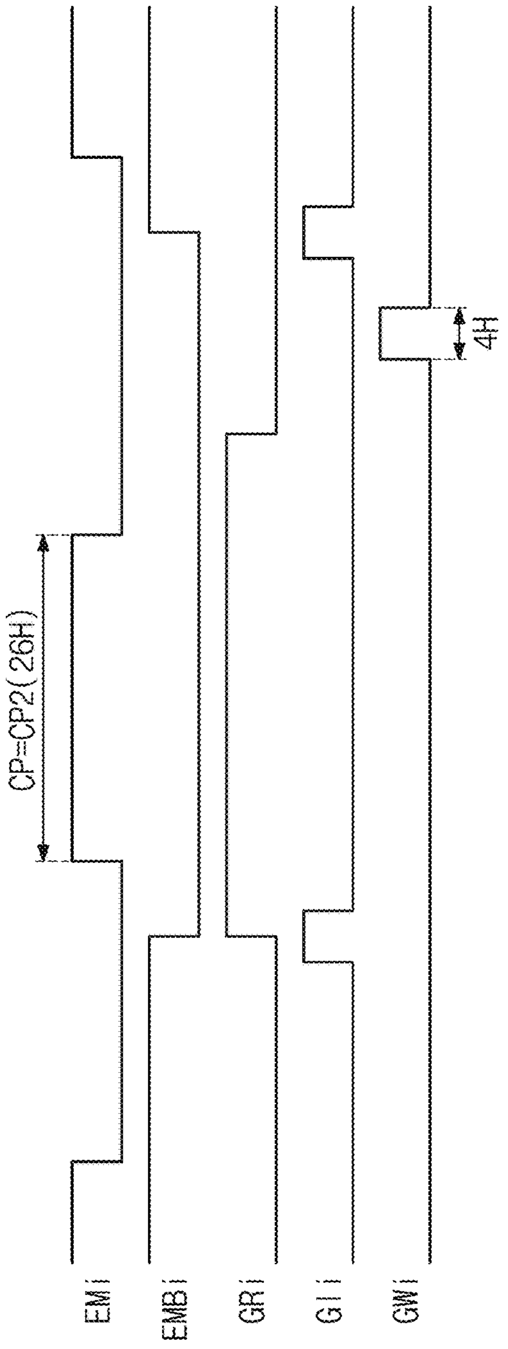

FIGS. 9A and 9B are timing diagrams showing an operation of the pixel PX.

In the example shown in FIG. 9A, when a time in which the scan signal GWi maintained at a high level is 4H, the compensation period CP has a first compensation time CP1. For example, the first compensation time CP1 is 34H. In an embodiment, 1H may be a time duration during which the data signal Di is provided to the pixels PX placed in one row of the display panel DP (see FIG. 2).

In the example shown in FIG. 9B, when a time in which the scan signal GWi maintained at a high level is 4H, the compensation period CP has a second compensation time CP2. For example, the second compensation time CP2 is 26H.

Figure 10A:
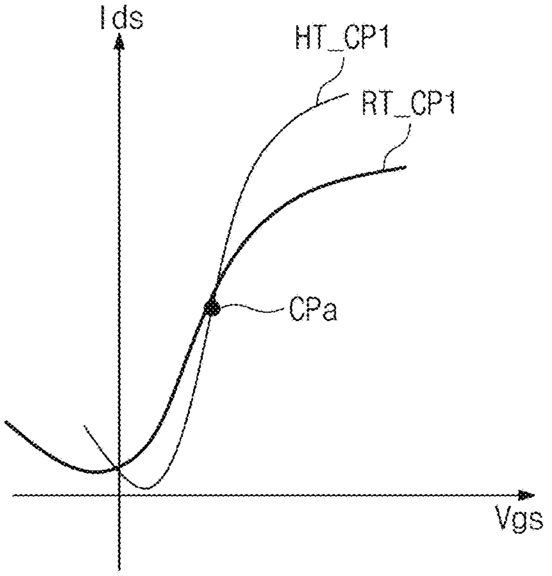
FIG. 10A is a diagram showing voltage-current characteristics of a first transistor in a pixel when a compensation period has a first compensation time.

FIG. 10A is a diagram showing voltage-current characteristics of the first transistor T1 in the pixel PX when the compensation period CP has the first compensation time CP1.

Referring to FIG. 10A, a first line RT_CP1 represents the voltage-current characteristics of the first transistor T1 in the pixel PX at room temperature (e.g., 25° C.) when the compensation period CP has the first compensation time CP1. A second line HT_CP1 represents the voltage-current characteristics of the first transistor T1 in the pixel PX at high temperature (e.g., 40° C.) when the compensation period CP has the first compensation time CP1.

Figure 10B:
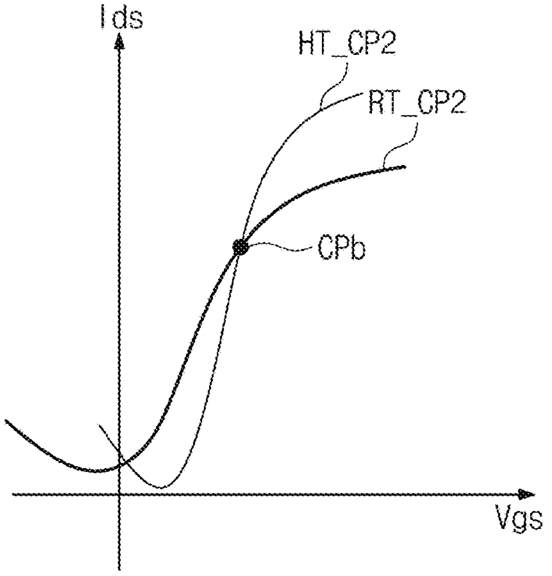
FIG. 10B is a diagram showing voltage-current characteristics of a first transistor in a pixel when a compensation period has a second compensation time.

FIG. 10B is a diagram showing voltage-current characteristics of the first transistor T1 in the pixel PX when the compensation period CP has the second compensation time CP2.

Referring to FIG. 10B, a third line RT_CP2 represents the voltage-current characteristics of the first transistor T1 (see FIG. 3) in the pixel PX at room temperature (e.g., 25° C.) when the compensation period CP has the second compensation time CP2. A fourth line HT_CP2 represents the voltage-current characteristics of the first transistor T1 in the pixel PX at high temperature (e.g., 40° C.) when the compensation period CP has the second compensation time CP2.

Referring to FIGS. 10A and 10B, the voltage-current characteristics of the first transistor T1 in the pixel PX at room temperature are not significantly affected by the compensation time of the compensation period CP.

When the compensation period CP has the first compensation time CP1 (i.e., when the compensation period CP becomes longer), the location of a compensation point CPa at which the first line RT_CP1 and the second line HT_CP1 are satisfied decreases.

When the compensation period CP has the second compensation time CP2 (i.e., when the compensation period CP becomes shorter), the location of a compensation point CPb at which the third line RT_CP2 and the fourth line HT_CP2 are satisfied increases.

In other words, it may be seen that the voltage-current characteristics of the first transistor T1 change depending on the compensation time of the compensation period CP when the ambient temperature is high.

The first transistor T1 changes a current Ids between the first electrode and the second electrode according to a voltage Vgs of a signal (i.e., the data signal Dj (see FIG. 3)) applied to the gate electrode, and thus the luminance of the light emitting element ED (see FIG. 3) may be adjusted by adjusting the compensation time of the compensation period CP.

Returning to FIG. 2, the driving controller 100 may output the emission control signal ECS based on target luminance information included in the control signal CTRL. The emission control signal ECS may output the emission signal EMi, which obtained by adjusting the compensation time of the compensation period CP, under the control of the driving controller 100.

In an embodiment, when the target luminance is the fifth target luminance DBV5, the compensation period CP may have the first compensation time CP1.

In an embodiment, when the target luminance is the first target luminance DBV1, the compensation period CP may have the second compensation time CP2.

In other words, as the target luminance is higher, the compensation time of the compensation period CP may be longer.

Figure 11:
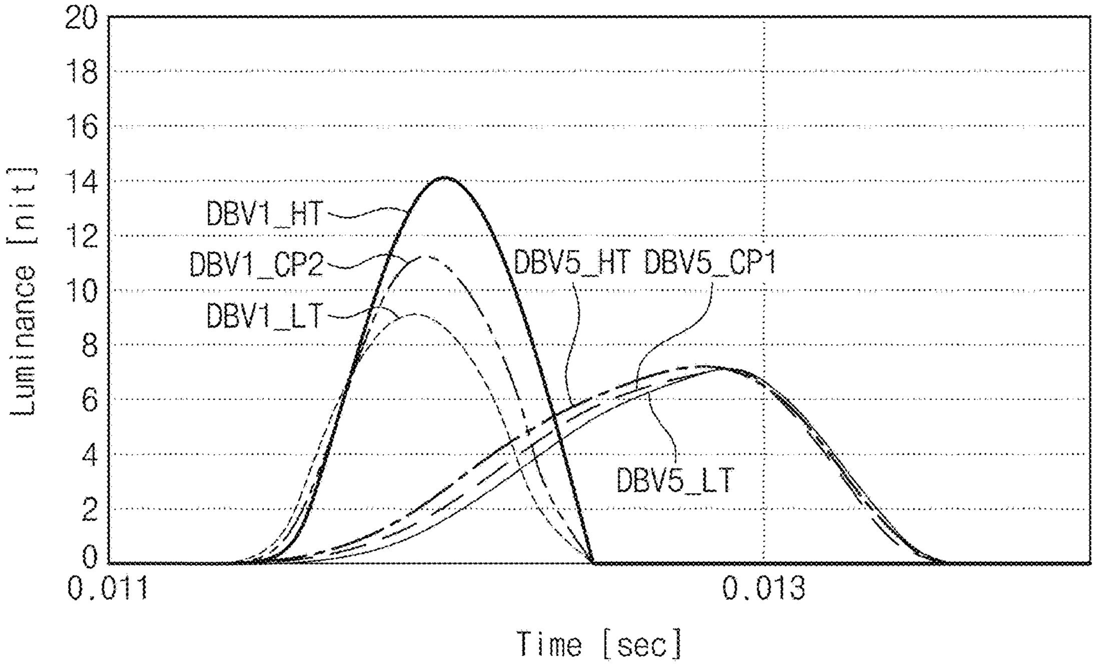
FIG. 11 is a graph showing a change in pixel luminance according to target luminance and ambient temperature.

FIG. 11 is a graph showing a change in pixel luminance according to target luminance and ambient temperature.

In FIG. 11, when the target luminance is the first target luminance DBV1, and the ambient temperature is low (e.g., 10° C.), a first line DBV1_LT shows a luminance change of the pixel PX (see FIG. 3) over time.

When the target luminance is the first target luminance DBV1, and the ambient temperature is high (e.g., 40° C.), a second line DBV1_HT shows the luminance change of the pixel PX over time.

When the target luminance is the first target luminance DBV1, the ambient temperature is high (e.g., 40° C.), and the compensation period CP has the second compensation time CP2, a fifth line DBV1_CP2 shows the luminance change of the pixel PX over time.

When the second line DBV1_HT is compared with the fifth line DBV1_CP2, it may be seen that the amount of change in luminance of the pixel PX according to ambient temperature has decreased as the compensation period CP is set to the second compensation time CP2 when the target luminance is the first target luminance DBV1.

When the target luminance is the fifth target luminance DBV5, and the ambient temperature is low (e.g., 10° C.), the third line DBV5_LT shows the luminance change of the pixel PX over time.

When the target luminance is the fifth target luminance DBV5, and the ambient temperature is high (e.g., 40° C.), the fourth line DBV5_HT shows the luminance change of the pixel PX over time.

When the target luminance is the fifth target luminance DBV5, the ambient temperature is high (e.g., 40° C.), and the compensation period CP has the first compensation time CP1, a sixth line DBV5_CP1 shows the luminance change of the pixel PX over time.

When the fourth line DBV5_HT is compared with the sixth line DBV5_CP1, it may be seen that the amount of change in luminance of the pixel PX according to ambient temperature has decreased as the compensation period CP is set to the first compensation time CP1 when the target luminance is the fifth target luminance DBV5.

As mentioned above, the luminance deviation according to the temperature of the electronic device DD may be reduced by setting the compensation time of the compensation period CP to an appropriate value depending on the target luminance. Accordingly, the change in temperature luminance sensitivity (i.e., the first display quality TLS (see FIG. 7)) of the electronic device DD may be effectively minimized.

Figure 12:
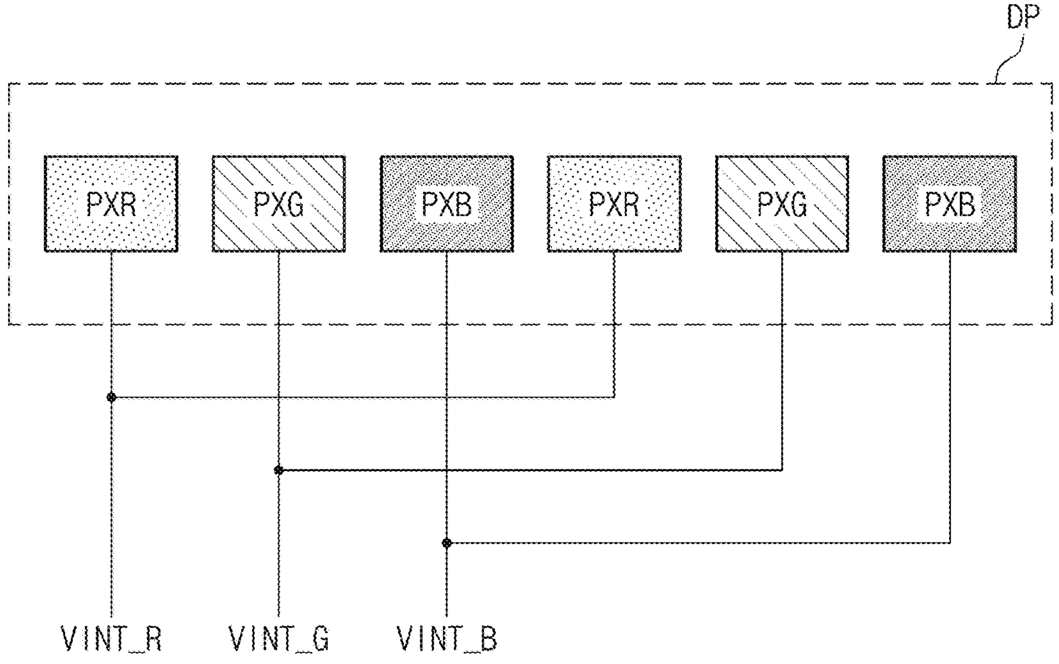
FIG. 12 is a diagram showing pixels placed on a display panel.

FIG. 12 is a diagram showing pixels placed on the display panel DP.

Referring to FIG. 12, the display panel DP includes first color pixels PXR, second color pixels PXG, and third color pixels PXB. The light emitting element ED (see FIG. 3) included in each of the first color pixels PXR, the second color pixels PXG, and the third color pixels PXB may emit different color lights.

In an embodiment, the first color pixels PXR receives the first initialization voltage VINT_R; the second color pixels PXG receives the second initialization voltage VINT_G; and, the third color pixels PXB receives the third initialization voltage VINT_B.

The first initialization voltage VINT_R, the second initialization voltage VINT_G, and the third initialization voltage VINT_B may be provided to the first electrode of the fourth transistor T4 in the pixel PX shown in FIG. 3.

The pixel PX shown in FIG. 3 may be a first color pixel PXR including the light emitting element ED emitting first color light. When the pixel PX is the first color pixel PXR including the light emitting element ED emitting first color light, the first initialization voltage VINT_R may be provided to the first electrode of the fourth transistor T4 in the pixel PX. When the pixel PX is the second color pixel PXG including the light emitting element ED emitting second color light, the second initialization voltage VINT_G may be provided to the first electrode of the fourth transistor T4 in the pixel PX. When the light emitting element ED included in the pixel PX emits third color light, the third initialization voltage VINT_B may be provided to the first electrode of the fourth transistor T4 in the pixel PX.

In an embodiment, the first initialization voltage VINT_R, the second initialization voltage VINT_G, and the third initialization voltage VINT_B may be different voltage levels from each other. In an embodiment, at least two of the first initialization voltage VINT_R, the second initialization voltage VINT_G, and the third initialization voltage VINT_B may have the same voltage level as each other.

Figure 13A:
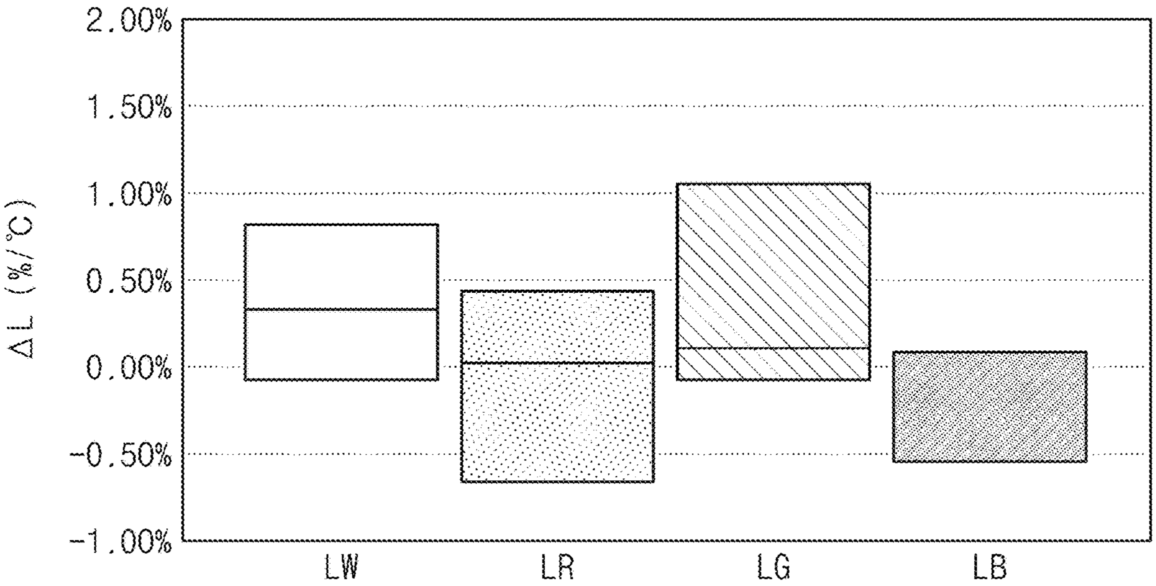
FIGS. 13A and 13B are graphs showing the luminance deviation of first color pixels, second color pixels, and third color pixels.
Figure 13B:
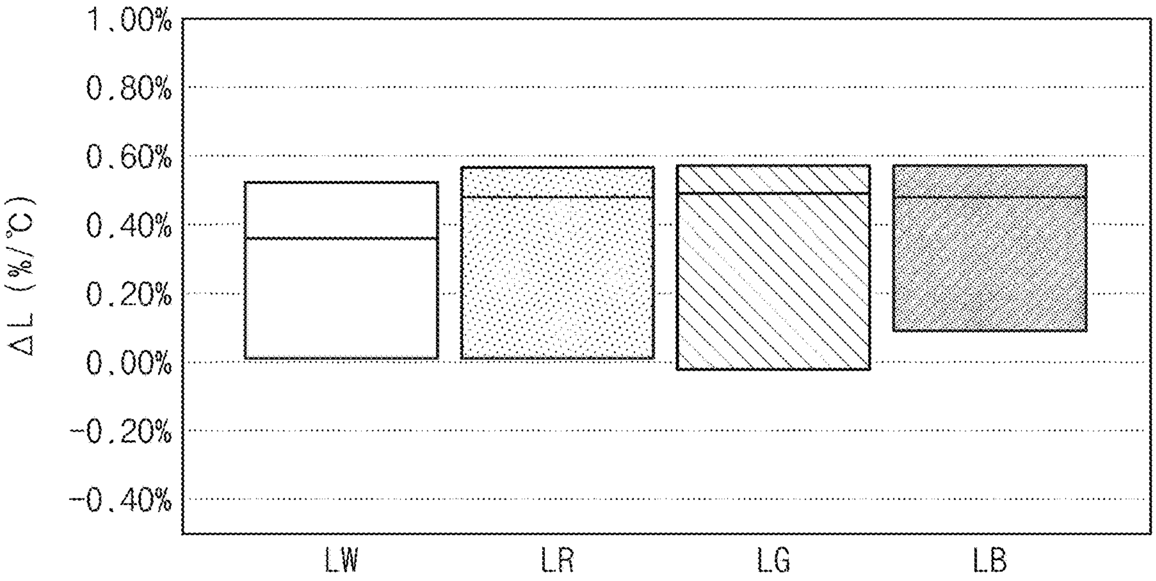

FIGS. 13A and 13B are graphs showing the luminance deviation of first color pixels, second color pixels, and third color pixels.

Referring to FIGS. 12 and 13A, luminance deviation LR in the first color pixels PXR, luminance deviation LG in the second color pixels PXG, and luminance deviation LB in the third color pixels PXB are shown when the ambient temperature changes from room temperature (e.g., 25° C.) to high temperature (e.g., 40° C.). In FIG. 13A, reference numeral LW represents luminance deviation when a white image is displayed in the first color pixels PXR, the second color pixels PXG, and the third color pixels PXB.

In the example shown in FIG. 13A, the luminance deviation LR of the first color pixels PXR and the luminance deviation LB of the third color pixels PXB are smaller than the luminance deviation LW of the white image and the luminance deviation LG of the second color pixels PXG.

As such, the luminance deviation between the first color pixels PXR, the second color pixels PXG, and the third color pixels PXB may lower the second display quality TCS of the electronic device DD (see FIG. 1). In an embodiment, the second display quality TCS is the temperature color sensitivity of the electronic device DD (see FIG. 1).

Referring back to FIG. 3, when the scan signal GIi is activated at a high level, the fourth transistor T4 may be turned on, and thus the anode of the light emitting element ED is initialized to the first initialization voltage VINT_R.

when all of the first, fifth, and sixth transistors T1, T5, and T6 are turned on in the emission period EP (see FIG. 4), the emission delay time of the light emitting element ED may be adjusted depending on a voltage difference (ELVDD-VINT_R) between the first driving voltage ELVDD and the voltage (i.e., the first initialization voltage VINT_R) of the anode of the light emitting element ED. For example, when the voltage level of the first initialization voltage VINT_R increases, the voltage difference (ELVDD-VINT_R) between the first driving voltage ELVDD and the voltage (i.e., the first initialization voltage VINT_R) of the anode of the light emitting element ED decreases, and the emission delay time of the light emitting element ED decreases.

In the example shown in FIG. 13A, the luminance deviation LR of the first color pixels PXR and the luminance deviation LB of the third color pixels PXB have a value less than 0. In an embodiment, the voltage level of each of the first initialization voltage VINT_R provided to the first color pixels PXR and the third initialization voltage VINT_B provided to the third color pixels PXB may be increased. The decrease in luminance of the first color pixels PXR and the third color pixels PXB may be compensated for by reducing the emission delay of the first color pixels PXR and the third color pixels PXB.

As a result, as shown in FIG. 13B, the luminance deviation LW of a white image according to temperature changes, the luminance deviation LR of the first color pixels PXR, the luminance deviation LG of the second color pixels PXG, and the luminance deviation LB of the third color pixels PXB become similar to each other. Accordingly, the second display quality TCS (i.e., temperature color sensitivity) of the electronic device DD (see FIG. 1) may be effectively improved.

Figure 14:
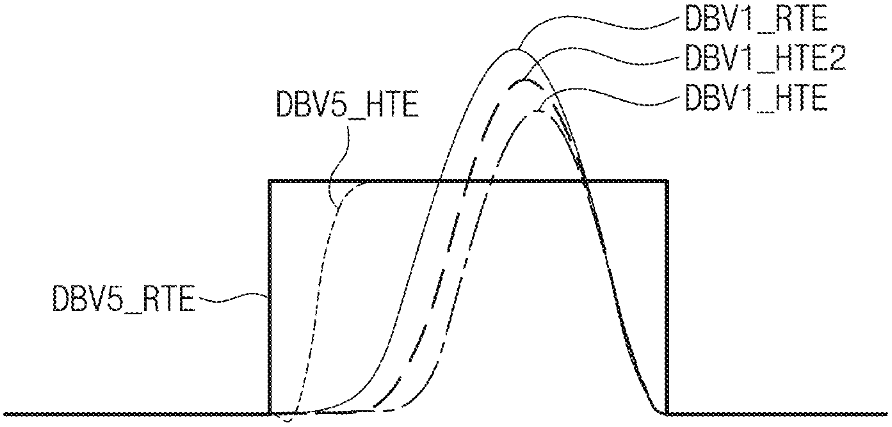
FIG. 14 is a diagram showing an emission signal according to target luminance and ambient temperature.

FIG. 14 is a diagram showing the emission signal EMi according to target luminance and ambient temperature.

The first line DBV5_RTE, the second line DBV5_HTE, the third line DBV1_RTE, and the fourth line DBV1_HTE, which are shown in FIG. 14, are the same as those shown in FIG. 6, and thus and additional descriptions are omitted to avoid redundancy.

Referring to FIGS. 12, 13A, and 14, a voltage level of each of the first initialization voltage VINT_R, the second initialization voltage VINT_G and the third initialization voltage VINT_B may be determined according to the luminance deviation LR of the first color pixels PXR, the luminance deviation LG of the second color pixels PXG, and the luminance deviation LB of the third color pixels PXB by the driving controller 100.

When the voltage level of each of the first initialization voltage VINT_R, the second initialization voltage VINT_G, and the third initialization voltage VINT_B is set to an optimal level, a fifth line DBV1_HTE2 shown in FIG. 14 may indicate the emission signal EMi corresponding to the first target luminance DBV1 at high temperature (e.g., 40° C.).

When the target luminance is low (e.g., the first target luminance DBV1) and the ambient temperature is high, the same effect as increasing the pulse width of the emission signal EMi may be achieved by reducing the emission delay of the first color pixels PXR and the third color pixels PXB. Accordingly, the second display quality TCS (i.e., temperature color sensitivity) of the electronic device DD (see FIG. 1) may be improved.

FIGS. 15A, 15B, and 15C show luminance deviation ΔL and chromaticity deviation du'v' according to a compensation time of the compensation period CP, the first initialization voltage VINT_R, the second initialization voltage VINT_G, and the third initialization voltage VINT_B.

FIGS. 15A, 15B, and 15C show the luminance deviation ΔL and the chromaticity deviation du'v' when target luminance is high (e.g., the fifth target luminance DBV5), and the target luminance is low (e.g., the first target luminance DBV1).

It is assumed that the electronic device DD (see FIG. 1) displays an image of 11 grayscale (G) (i.e., 1 nit (NIT)) when the target luminance is high. It is assumed that the electronic device DD (see FIG. 1) displays an image of 39 grayscale (G), (i.e., 0.06 nits (NIT)) when target luminance is high.

FIG. 15A shows the luminance deviation ΔL and the chromaticity deviation du'v' according to the target luminance when the compensation time of the compensation period CP is 46H, the first initialization voltage VINT_R is −2.0 V, the second initialization voltage VINT_G is −3.50 V, the third initialization voltage VINT_B is −2.0 V, and the second driving voltage ELVDD is 0.0 V regardless of the target luminance.

In the example shown in FIG. 15A, when the target luminance is high (e.g., the fifth target luminance DBV5), the luminance deviation ΔL is −1.5%, and the chromaticity deviation du'v' is 0.0144. When the target luminance is low (e.g., the first target luminance DBV1), the luminance deviation ΔL is 11%, and the chromaticity deviation du'v' is 0.0172.

FIG. 15B shows the luminance deviation ΔL and the chromaticity deviation du'v' according to target luminance in the case where a compensation time of the compensation period CP increases to 50H when target luminance is high (e.g., the fifth target luminance DBV5), or in the case where a compensation time of the compensation period CP decreases to 26H when the target luminance is low (e.g., the first target luminance DBV1).

In the example shown in FIG. 15B, when the target luminance is high (e.g., the fifth target luminance DBV5), the luminance deviation ΔL decreases from −1.5% (see FIG. 15A) to 0.5%. When the target luminance is low (e.g., the first target luminance DBV1), the luminance deviation ΔL decreases from 11% (see FIG. 15A) to 0.9%.

FIG. 15C shows the luminance deviation ΔL and the chromaticity deviation du'v' according to target luminance in the case where each of the first initialization voltage VINT_R and the third initialization voltage VINT_B is lowered to −3.5 V when target luminance is high (e.g., the fifth target luminance DBV5), in the case where the second initialization voltage VINT_G is lowered to −5 V when the target luminance is low (e.g., the first target luminance DBV1), and when the first initialization voltage VINT_R and the third initialization voltage VINT_B are increased to −1 V.

In the example shown in FIG. 15A, the chromaticity deviation du'v' of 0.0144% means that the color of the image displayed on the electronic device DD (see FIG. 1) has moved to a reddish direction. Accordingly, it is necessary to delay the emission speed of the first color pixels PXR and the third color pixels PXB by lowering the voltage level of the first initialization voltage VINT_R and the third initialization voltage VINT_B.

In the example shown in FIG. 15C, the chromaticity deviation du'v' may be reduced from 0.0144% (see FIG. 15A) to 0.0078% by lowering the first initialization voltage VINT_R and the third initialization voltage VINT_B to −3.5 V when the target luminance is high (e.g., the fifth target luminance DBV5).

In the example shown in FIG. 15A, the chromaticity deviation du'v' of 0.0172% means that the color of the image displayed on the electronic device DD (see FIG. 1) has moved to a greenish direction. Accordingly, it is necessary to delay the emission speed of the second color pixels PXG by lowering a voltage level of the second initialization voltage VINT_G, and to reduce the emission delay of the first color pixels PXR and the third color pixels PXB by increasing the voltage level of the first initialization voltage VINT_R and the third initialization voltage VINT_B.

In the example shown in FIG. 15C, when the target luminance is low (e.g., the first target luminance DBV1), the chromaticity deviation du'v' may be reduced from 0.0172% (see FIG. 15A) to 0.0097%. by lowering the second initialization voltage VINT_G to −5 V and increasing the first initialization voltage VINT_R and the third initialization voltage VINT_B to −1 V.

Figure 16:
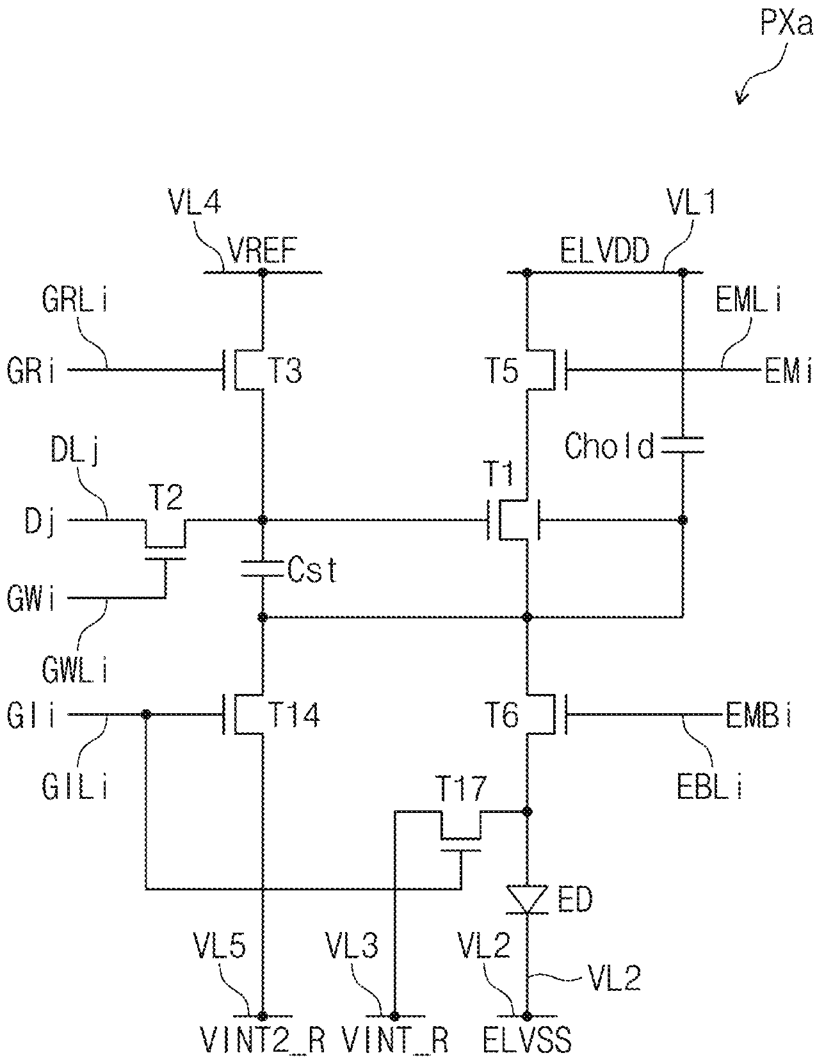
FIG. 16 is a circuit diagram of a pixel, according to an embodiment of the present disclosure.

FIG. 16 is a circuit diagram of a pixel PXa, according to an embodiment of the present disclosure.

Referring to FIG. 16, a pixel PXa includes the first, second, third, fifth and sixth transistors T1, T2, T3, T5, and T6, a fourteenth transistor T14, the seventeenth transistor T17, the first capacitor Cst, the second capacitor Chold, and the light emitting element ED. Because the first, second, third, fifth and sixth transistors T1, T2, T3, T5, and T6, the first capacitor Cst, the second capacitor Chold, and the light emitting element ED of the pixel PXa are substantially the same as the first, second, third, fifth and sixth transistors T1, T2, T3, T5, and T6, the first capacitor Cst, the second capacitor Chold, and the light emitting element ED of the pixel PX illustrated in FIG. 3, the same reference numerals are used, and additional descriptions are omitted to avoid redundancy.

The fourteenth transistor T14 is connected between the second electrode of the first capacitor Cst and a fifth driving voltage line VL5, and includes a gate electrode connected to the scan line GILi.

The seventeenth transistor T17 is connected between the anode of the light emitting element ED and the third driving voltage line VL3, and includes a gate electrode connected to the scan line GILi.

In an embodiment, the voltage generator 500 may further provide an initialization voltage VINT2_R to the fifth driving voltage line VL5.

In an embodiment, the light emitting element ED of the pixel PXa shown in FIG. 16 may emit first color light.

When the light emitting element ED of the pixel PXa emits second color light or third color light, the fifth driving voltage line VL5 may receive an initialization voltage different from the initialization voltage VINT2_R.

For example, the first color pixels PXR shown in FIG. 12 may receive the initialization voltage VINT2_R; the second color pixels PXG may receive an initialization voltage (referred to as "VINT2_G"); and, the third color pixels PXB may receive an initialization voltage (referred to as "VINT2_B").

In other words, in the similar method in which voltage levels of the first initialization voltage VINT_R, the second initialization voltage VINT_G, and the third initialization voltage VINT_B are determined depending on the luminance deviation between the first color pixels PXR, the second color pixels PXG, and the third color pixels PXB, the voltage levels of the initialization voltage VINT2_R, an initialization voltage VINT2_G, and an initialization voltage VINT2_B may be determined by the driving controller 100.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

An electronic device with this configuration may vary a compensation time depending on target luminance. Accordingly, display quality deviation according to the target luminance may be effectively minimized. Moreover, an electronic device according to an embodiment of the present disclosure may provide an initialization voltage suitable for each color pixel. Therefore, the luminance deviation between color pixels may be effectively minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a light emitting element;

a first transistor including a first electrode, a second electrode, and a gate electrode configured to receive a data signal;

a second transistor connected between a first driving voltage line and the first electrode of the first transistor and configured to receive a first emission signal; and a third transistor connected between the second electrode of the first transistor and the light emitting element and configured to receive a second emission signal, wherein a cycle includes a compensation period and an emission period, wherein, during the compensation period, the second transistor is turned on and the third transistor is turned off, wherein when target luminance has a first value, a compensation time of the compensation period is a first time;

wherein when the target luminance has a second value different from the first value, the compensation time of the compensation period is a second time different from the first time.

2. The electronic device of claim 1, wherein the first emission signal is at an active level for turning on the second transistor in each of the compensation period and the emission period.

3. The electronic device of claim 1, wherein the first time is longer than the second time when the first value is greater than the second value.

4. The electronic device of claim 1, further comprising:

a fourth transistor connected between the light emitting element and an initialization voltage line configured to receive an initialization voltage.

5. The electronic device of claim 4, wherein a voltage level of the initialization voltage depending on the target luminance and characteristics of the light emitting element.

6. The electronic device of claim 1, wherein each of the first transistor, the second transistor, and the third transistor is an N-type transistor.

7. An electronic device comprising:

a memory;

a display panel including a plurality of pixels, each of which is connected to a plurality of scan lines, a first emission line, a second emission line, and a data line;

a scan driving circuit configured to output a plurality of scan signals to the plurality of scan lines;

an emission driving circuit configured to output a first emission signal and a second emission signal to the first emission line and the second emission line, respectively; and a driving controller configured to control the emission driving circuit depending on target luminance, wherein each of the plurality of pixels includes:

a light emitting element;

a first transistor including a first electrode, a second electrode, and a gate electrode configured to receive a data signal from the data line;

a second transistor connected between a first driving voltage line and the first electrode of the first transistor and configured to receive the first emission signal; and a third transistor connected between the second electrode of the first transistor and the light emitting element and configured to receive the second emission signal, wherein the first emission signal includes a compensation period and an emission period, and the memory stores instructions that, when executed by the driving controller, cause the driving controller to select, from among a plurality of predetermined compensation times, a compensation time of the compensation period depending on the target luminance such that, when the target luminance is higher, a longer compensation time is selected.

8. The electronic device of claim 7, wherein the first emission signal is at an active level for turning on the second transistor in each of the compensation period and the emission period.

9. The electronic device of claim 7, wherein when the target luminance has a first value, the compensation time of the compensation period is a first time, wherein when the target luminance has a second value, the compensation time of the compensation period is a second time, and wherein the memory stores instructions that, when executed by the driving controller, cause the driving controller to set the first time longer than the second time when the first value is greater than the second value.

10. The electronic device of claim 7, wherein the plurality of pixels includes a first color pixel, a second color pixel, and a third color pixel.

11. The electronic device of claim 10, further comprising:

a voltage generator configured to generate a first initialization voltage provided to the first color pixel, a second initialization voltage provided to the second color pixel, and a third initialization voltage provided to the third color pixel, wherein the memory stores instructions that, when executed by the driving controller, cause the driving controller to determine a voltage level of each of the first initialization voltage, the second initialization voltage, and the third initialization voltage depending on the target luminance and luminance deviation between the first color pixel, the second color pixel, and the third color pixel.

12. The electronic device of claim 11, wherein the first color pixel further includes:

a fourth transistor connected between the light emitting element and a first initialization voltage line configured to receive the first initialization voltage.

13. The electronic device of claim 12, wherein the first color pixel further includes:

a fifth transistor connected between the data line and the gate electrode of the first transistor, and including a gate electrode connected to a first scan line of the plurality of scan lines; and a sixth transistor connected between a reference voltage line and the gate electrode of the first transistor and including a gate electrode connected to a second scan line of the plurality of scan lines.

14. The electronic device of claim 13, wherein the first color pixel further includes:

a capacitor including a first electrode connected to the first gate electrode of the first transistor, and a second electrode; and a seventh transistor connected between the second electrode of the capacitor and a second initialization voltage line.

15. The electronic device of claim 7, wherein each of the first transistor, the second transistor, and the third transistor is an N-type transistor.

16. An electronic device comprising:

a memory;

a driving controller;

a display panel including a first color pixel, a second color pixel, and a third color pixel; and a voltage generator configured to generate a first initialization voltage provided to the first color pixel, a second initialization voltage provided to the second color pixel, and a third initialization voltage provided to the third color pixel, wherein the memory stores instructions that, when executed by the driving controller, cause the driving controller to select, for each frame, a voltage level of each of the first initialization voltage, the second initialization voltage, and the third initialization voltage from among a plurality of predetermined per-color initialization voltages stored in the memory, based on target luminance and luminance deviation between the first color pixel, the second color pixel, and the third color pixel, so as to reduce inter-color luminance deviation.

17. The electronic device of claim 16, wherein the first color pixel includes:

a light emitting element configured to emit first color light;

a first transistor including a first electrode, a second electrode, and a gate electrode configured to receive a data signal;

a second transistor connected between a first driving voltage line and the first electrode of the first transistor and configured to receive a first emission signal;

a third transistor connected between the second electrode of the first transistor and the light emitting element and configured to receive a second emission signal; and a fourth transistor connected between the light emitting element and an initialization voltage line configured to receive the first initialization voltage.

18. The electronic device of claim 17, wherein the first emission signal includes a compensation period and an emission period, and the memory stores instructions that, when executed by the driving controller, cause the driving controller to determine a compensation time of the compensation period depending on the target luminance.

19. The electronic device of claim 18, wherein the first emission signal is at an active level for turning on the second transistor in each of the compensation period and the emission period.

20. The electronic device of claim 18, wherein when the target luminance has a first value, the compensation time of the compensation period is a first time, wherein when the target luminance has a second value, the compensation time of the compensation period is a second time, and wherein the memory stores instructions that, when executed by the driving controller, cause the driving controller to set the first time longer than the second time when the first value is greater than the second value.

* * * * *